United States Patent [19]

Bruch

[11] Patent Number: 4,831,484
[45] Date of Patent: May 16, 1989

[54] ELECTRICAL SAFETY BARRIER FOR PROTECTION OF ELECTRICAL LOAD ELEMENTS PLACED IN POTENTIALLY HAZARDOUS LOCATIONS

[75] Inventor: Peter Bruch, Waldenburg, Fed. Rep. of Germany

[73] Assignee: R. Stahl Schaltgerate GmbH, Kunzelsau, Fed. Rep. of Germany

[21] Appl. No.: 58,590

[22] Filed: Jun. 5, 1987

[30] Foreign Application Priority Data

Jul. 3, 1986 [DE] Fed. Rep. of Germany ....... 3622268

[51] Int. Cl.⁴ .............................................. H02H 3/05
[52] U.S. Cl. ..................................... 361/101; 361/88; 361/87
[58] Field of Search ...................... 361/101, 91, 93, 18, 361/88, 104, 111, 87, 86, 79, 58

[56] References Cited

U.S. PATENT DOCUMENTS

| | | | |
|---|---|---|---|
| 3,109,980 | 11/1963 | Wiley | 361/101 X |
| 3,432,726 | 3/1969 | Meyer et al. | 361/18 X |
| 4,017,789 | 4/1977 | Morris | 361/18 X |
| 4,119,906 | 10/1978 | Gonda | 361/18 X |
| 4,202,023 | 5/1980 | Sears | 361/93 X |
| 4,319,179 | 3/1982 | Jett, Jr. | 361/18 X |
| 4,412,265 | 10/1983 | Buuck | 361/91 X |
| 4,438,473 | 3/1984 | Cawley et al. | 361/101 X |

FOREIGN PATENT DOCUMENTS

| | | |
|---|---|---|
| 282944 | 6/1965 | Australia ............................... 361/101 |
| 2019937 | 11/1971 | Fed. Rep. of Germany . |
| 3523369 | 1/1987 | Fed. Rep. of Germany . |
| 131597 | 11/1979 | German Democratic Rep. . |
| 145352 | 12/1980 | German Democratic Rep. . |

Primary Examiner—A. D. Pellinen
Assistant Examiner—A. Jonathan Wysocki
Attorney, Agent, or Firm—Frishauf, Holtz, Goodman & Woodward

[57] ABSTRACT

The barrier input and output each have two terminals. In at least one connection between the barrier input and the barrier output, there is an electronic in-line control element having a control input as well as, in series with the in-line control element, a current sensing element that emits an output voltage corresponding to the current. A control circuit having a control input controls the conductive state of the in-line control element and to this end receives the output voltage of the current sensing element. In accordance with the invention, to obtain a steeper limiting characteristic, the control voltage for the control circuit is the sum of at least part of the output voltage of the current sensing element and at least part of a voltage corresponding to the voltage drop in the in-line control element. The control element is formed by two serially connected transistors (11a, 11b); the control cirucit includes four active elements (33a-33d) which are connected to individual summing circuits and provide, in pairs, output signals to control the serially connected transistors.

21 Claims, 4 Drawing Sheets

ELECTRICAL SAFETY BARRIER FOR PROTECTION OF ELECTRICAL LOAD ELEMENTS PLACED IN POTENTIALLY HAZARDOUS LOCATIONS

The present invention relates to a safety barrier, and more particularly to a safety barrier circuit which protects load elements, such as power consuming loads, measuring instruments or transducers and the like, which may be placed in locations which are hazardous, for example in locations where explosive atmospheres may be present.

BACKGROUND

German Patent No. 20 19 937 describes a safety barrier circuit structure which utilizes an in-line control element, formed as a bipolar power transistor, having a collector which is directly connected to the input of the safety barrier, and an emitter which is connected to the output through a current measuring resistor. The standards of safety barriers are set forth in e.g. DIN EN 50020.

Leading from the collector to the base of the the in-line transistor is a resistor that at the same time is the operating resistor of a bipolar control transistor, the collector of which is applied to the base of the in-line transistor and the emitter of which is connected directly to the barrier output. Its base is connected to the emitter of the bipolar power transistor, so that the voltage drop at the emitter resistor of the power transistor is the control voltage for the second, control transistor.

In normal operation, the in-line transistor is kept in the conductively saturated state by the operating resistor connected between its base and its collector, because the control transistor is in the blocking state as long as the voltage drop at the emitter resistor of the in-line transistor remains below the threshold voltage of the control transistor - in a silicon transistor this is approximately 0.6 V. As soon as the current through the safety barrier reaches a value that causes the voltage drop at the emitter resistor of the in-line transistor to increase to above the threshold voltage of the control transistor, the control transistor begins to conduct and assumes a more or less large current component, which flows from the operating resistor and which, when the control transistor was blocked, flowed solely into the base of the in-line transistor. With an increasing current transfer by the control transistor, the in-line transistor representing the actual power element becomes gradually blocked, so that the current through the safety barrier can now increase only very slowly, if there is an increasing load on the output voltage of the safety barrier. In that operating condition the safety barrier has a very high internal resistance, whereas previously there was only a low internal resistance, which was substantially due to the emitter resistor for the power transistor and to the specifications of the turned-on power transistor.

The current increase that is also possible upon attaining the limit condition when there is an increasing load at the barrier output limits the useful operating range of the known safety barrier, because when the output voltage at the barrier output is decreasing, increasing maximum currents arise. To remain on the safe side in that situation, that is, so as to have low output voltages that do not exceed the maximum permissible current, the limiting point for large output voltages must be at correspondingly low currents, which means that with full output voltage only a low output current is possible.

Furthermore, the circuit of the known safety barrier, even in the conductively saturated state, has a relatively high internal resistance, resulting from the size of the emitter resistor plus the output internal resistance of the in-line transistor. The size of the emitter resistor is a function of the current limitation and the threshold voltage of the control transistor, depending on the required operating point. The lower the threshold current of the barrier becomes, the larger the emitter resistor will accordingly be.

Under some circumstances, both resistors may falsify the measurement result considerably, e.g., if a measuring converter is connected to the barrier output, this converter imposing a current between 4 and 20 mA when a minimum supply voltage is applied to the connected current circuit as a function of the measurement variable (for example, flow or pressure).

It is important here to keep the in-line resistor of the barrier incorporated in the transmitter current circuit small enough that even at the maximum current (20 mA) a sufficiently large supply voltage for the transmitter will remain. The situation becomes still more unfavorable if two circuits such as those described above are connected in series to improve error redundancy, as in the known safety barrier, because in that case the sizes of the emitter resistors as well as of the internal resistances are consequently summed together.

The above-described relatively flat limiting characteristic of the known safety barrier is due, first, to the finite amplification of finite steepness of the control transistor, which does not operate digitally but instead is controlled to be conductive and therefore assures a controlled turn-off state of the in-line transistor only to the extent that the voltage drop at the emitter resistor of the in-line transistor is also increasing. A further cause for the relatively flat characteristic after the limiting condition is the increasing current through the control transistor in the limiting situation.

THE INVENTION

It is an object to provide a safety barrier in which a steep turn-off characteristic can be obtained and which, until cut off, has low internal resistance, which, for example, remains constant or drops under loading, up to cut-off.

Briefly, at least a portion of the inherent voltage drop across a controlled resistance element - typically a bipolar transistor - and at least a portion of a measuring voltage drop across a current measuring element - typically a resistor - are summed to obtain a control signal. The control signal, thus, will have a level which is a function of the summed portions of the respective voltage drops. The control signal is then applied to the controlled resistance - typically the bipolar transistor - to control the conduction or, in other words, the resistance value thereof.

The voltage drop at the in-line control element is additionally superimposed on the output voltage of the current measuring element. The result is a positive feedback at the same time, which theoretically can cause amplification of the circuit comprising the in-line control element and the control circuit to tend toward infinity, even if the active elements of the control circuit have only a finite amplification. Depending upon how large the control voltage component for the control circuit is, which is derived from the in-line voltage of the in-line control element, the result is a rise for the limiting characteristic that is adjustable within wide limits. Dual, serially connected and interconnected controlled resistance elements, interconnected with four summing circuits, are provided to ensure reliability even in case of malfunction of parts or components.

Figure 1:
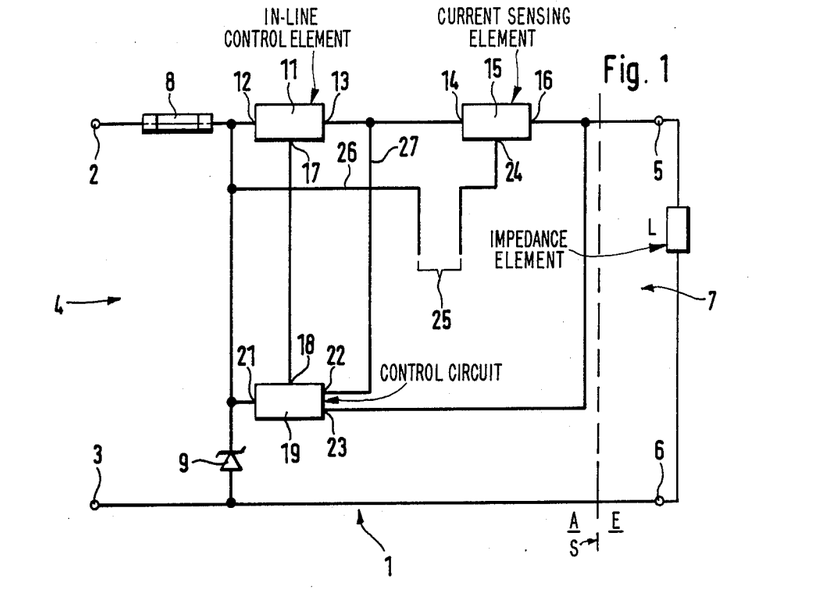
FIG. 1 shows a safety barrier according to the invention in block circuit diagram form.

DETAILED DESCRIPTION In FIG. 1, a safety barrier 1 is shown in in the form of a block circuit diagram. This safety barrier serves to limit the current and voltage on their intrinsically-safe output side to a value at which there is no danger of explosion. The safety barrier can therefore be located in a circuit that leads into a region E that is a hazardous area. The barrier 1 has an input 4 for connection with the lines of these current circuits, it has an input 4 having two terminals 2 and 3 as well as an output 7 also having two terminals 5 and 6, from which the lines lead into this region E. The safety barrier 1 is located outside the hazardous area E, i.e. in the safe area A. The terminals 3 and 6 are connected directly for conduction, and their connection represents the reference potential of the safety barrier 1 or the circuit ground. Separating line S schematically represents the separation between the regions A and E.

Parallel to the input 4 is a series circuit comprising a melt-down fuse 8 and a Zener diode 9, by which the voltage at the output 7 is limited to the maximum value corresponding to the breakdown voltage of the Zener diode 9. Larger input voltages lead to a melting of the fuse 8 and thus to a disconnection in the safety barrier 1.

The current limitation is effected with an in-line control element 11, one terminal 12 of which is connected to the connection point between the melt-down fuse and the Zener diode 9 and the output terminal 13 of which is connected to one input 14 of a current sensing element 15, the output 16 of which leads directly to the output terminal 5. The in-line control element 11 has a control input 17 and is therefore located at a control output 18 of a control circuit 19. The supply of current to the control circuit 19 is effected via its circuit supply input 21, which is also connected to the connecting point between the fuse 8 and the Zener diode 9. The control circuit 19 receives its input or control signal via its two terminals 22 and 23. The terminal 23 is connected directly to the output terminal 5. The terminal 22 receives a summing voltage with respect to the opposite the terminal 23. The summing voltage is composed of at least part of the voltage across, or the voltage drop across the in-line control element 11 and of the output voltage of the current sensing element 15. Current sensing element 15 provides the sensing output voltage at its output 24 with respect to terminal 16, and thus the output terminal 5 or the control input terminal 23. This sensing output voltage at terminal 24 is proportional to the flow of current through current sensing element 15. The summation of these voltages is illustrated schematically by bracket 25.

The voltage drop produced across the in-line control element 11 is fed to the control circuit 19 via lines 26 and 27, of which one is connected to the input terminal 12 and the other to the output terminal 13.

Figure 2:
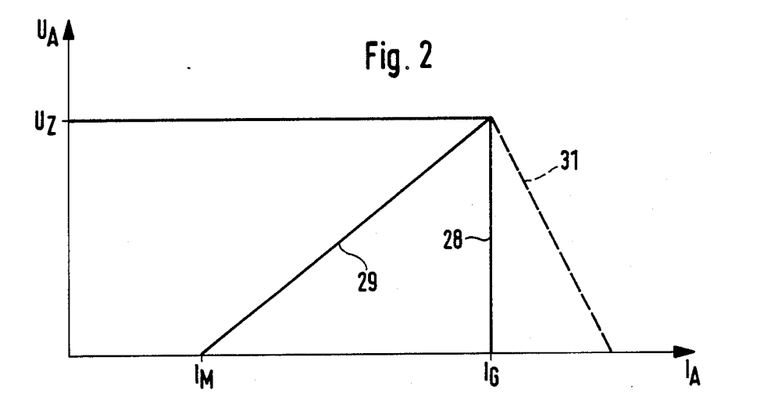
FIG. 2 shows the output characteristic of the safety barrier of FIG. 1, wherein the abscissa represents the output current, and the ordinate represents the output voltage.

Operation, with reference to FIG. 2:

(a) Normal Operation: At the output 7 of the safety barrier, a current is available that is lower than the threshold value $I_G$. At the input 4 of the safety barrier 1 a supply voltage is made available, which is lower than the breakdown voltage of the Zener diode 9, which is designated $U_Z$ in FIG. 2. Under these operating conditions, the control circuit 19 is supplied at its current supply input 21 with current from the voltage source connected to the input 4 of the barrier, and at its control output 18 it emits a signal voltage to the control input 17 of the in-line control element 11 such that the in-line control element 11 is kept in conductive state; a slight voltage drop occurs across the in-line control element 11. The voltage between the lines 26 and 27 is virtually zero.

Since the current flowing out of the barrier 1 is lower than the threshold current, the current sensing element 15 also generates a voltage at its output 24 with respect to the terminal 16 dimensioned only such that together with the voltage between the terminals 26 and 27 it remains below a predetermined threshold value; that is, the voltage between the terminals 22 and 23 of the control circuit 19 is below the threshold beyond which the control circuit 19 begins to turn the in-line control element off. The safety barrier 1 therefore virtually does not affect the current flowing through it, and the impedance to be measured at the input 4 largely is equivalent to the impedance that is connected to the output 7. This impedance is shown schematically in FIG. 1 as a load or impedance element L. This is equivalent to an operating condition within the rectangle defined by the corner points $U_Z$ and $I_G$ in the coordinate system of FIG. 2, in which the output current is plotted on the abscissa and the output voltage is plotted on the ordinate.

(b) Overvoltage at Input 4: If an error condition arises, leading to a rise in the voltage at the input 4, the Zener diode 9 begins to become conductive once its Zener voltage is exceeded. The very steep course of becoming conductive on the part of the Zener diode 9 leads to an additional current rise through the melt-down fuse 8, which finally, upon a further increase in the input voltage, burns through and thus switches the output 7 so that it is de-energized, i.e. without current.

(c) Overloading: If the output 7 of the safety barrier 1 is increasingly more heavily loaded and output current exceeds the threshold value $I_G$, the current sensing element 15 generates an output voltage between the terminals 24 and 16 such that the sum of this voltage plus the initially negligible voltage drop at the in-line control element 11 exceeds the switching threshold of the control circuit 19. As a result of exceeding of this predetermined switching threshold, a voltage appears at the control output 18 that controls the in-line control element 11, and so a corresponding voltage drop now appears at the in-line control element 11, which correspondingly further increases the control voltage for the control circuit 19, namely the voltage between the two terminals 22 and 23. This increase in the control voltage causes a further decrease in the control voltage or control current and of current through the in-line control element 11, which is then controlled further in the direction of its blocking state. Depending on the loop amplification in the control circuit formed by the in-line control element 11, the current sensing element 15 and the control circuit 19, the voltage at the output 7 decreases more or less rapidly when the current threshold value $I_G$ is exceeded. Depending on the dimensioning, an approximately rectangular output characteristic, such as that represented by a straight line 28 (FIG. 2) may be attained; that is, even after the threshold value $I_G$ has been exceeded only very slightly, the output voltage $U_A$ decreases to the value determined by $I_G$ and the load connected to the output 7; and when the current drops below $I_G$ the output voltage immediately returns back to the corresponding output value.

In another kind of dimensioning, a so-called fold-back characteristic is attained such as that represented by a straight line 29. A safety barrier having this characteristic curve would decrease the current due to the load connected to the output 7, when the threshold value $I_G$ is exceeded, abruptly to a value $I_M$. In the first case described above, the output current would maintain its maximum permissible value $I_G$ at all times, regardless of the output voltage. The fold-back characteristic has the has the advantage, that in a malfunction or fault situation, that is, after the threshold value $I_G$ is exceeded, the current through the safety barrier 1 is also reduced and thus the power loss that is converted in the in-line control element 11 is reduced accordingly.

Dimensioning is also possible to produce a fold-back characteristic, in which only a voltage or a current corresponding to the load is produced, in which the voltage or current differs from the minimum value, is also possible.

These forms of characteristic represented by the curve 28 or the curve 29 arise by providing that in addition to the control voltage received from the current sensing element 15, the voltage drop across the in-line control element 11 is summed as well, as soon as the in-line control element 11 has been controlled out of the conductive condition toward the blocking condition by the control circuit 19 tripped by the current sensing element 15. The in-line voltage of or voltage across the in-line control element 11, that is, the voltage between the terminals 12 and 13, is a feedback voltage, which amplifies the effect of the output voltage from the current sensing element 15. Without this additional feedback, due to finite amplification of the control circuit 19, only a very much flatter limiting characteristic could be established, approximately such as that represented by the straight line 31 drawn in dashed lines in FIG. 2.

ILLUSTRATIVE EXAMPLE OF A PREFERRED CIRCUIT

Figure 3:
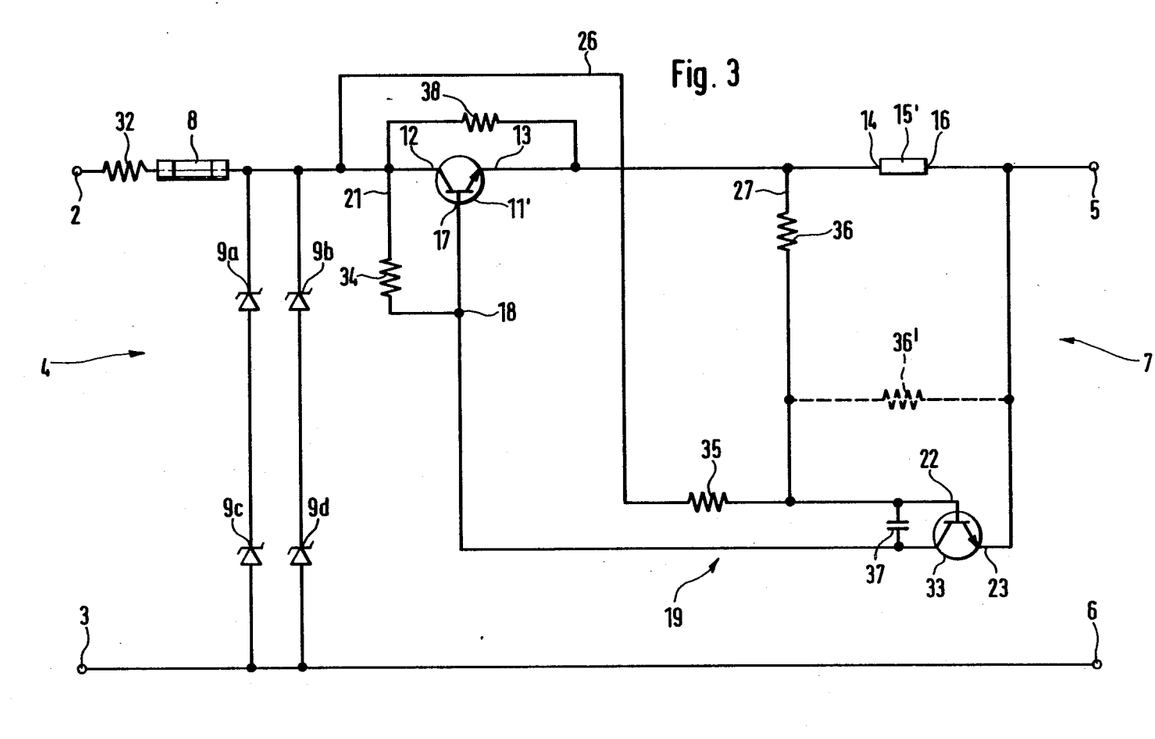
FIG. 3 is a detailed circuit diagram of the safety barrier according to FIG. 1.

FIG. 3 shows the detailed circuit diagram of an embodiment of the safety barrier according to FIG. 1. Corresponding structural elements and terminal points are identified by the same reference numerals with prime notation, where appropriate.

For the sake of greater error redundancy and better power loss distribution, the Zener diode 9 of FIG. 1 is replaced in a practical embodiment by means of a serial parallel circuit of a total of four Zener diodes 9a–9b, so that if there is a line disconnection in one of the four Zener diodes 9a–9d, the other parallel branch 9a, 9c or 9b, 9d always continues to act to limit the voltage.

A protective resistor 32 is also serially connected with the melt-down fuse 8, so dimensioned that the short-circuit current is limited to a value yet still capable of reliably interrupting the melt-down fuse 8.

The in-line control element 11 comprises a bipolar n-p-n transistor 11, the collector of which represents the input terminal 12 and the emitter of which represents the output terminal 13.

The current sensing element 15 that is connected in series with the in-line control element, namely the transistor 11, is a simple ohmic resistor 15' in which the voltage drop is proportional to the current through the resistor; that is, its two terminals 14 and 16 by way of which the barrier current flows are also at the same time the terminals by way of which the output voltage for controlling the control circuit 19 is picked-up.

The control circuit 19 comprises a bipolar transistor 33, connected in an emitter circuit, of the same type as the transistor 11', the emitter of the transistor 33 representing the input terminal 23 and the base of this transistor representing the further control input 22; that is, the transistor 33 of the control circuit 19 is controlled directly via the base-to-emitter path of the transistor 33. The collector of the transistor 33 is connected to a resistor 34, and the connecting point between the resistor 34 and the collector of the transistor 33 forms the control output 18 of the control circuit 19, which is connected to the base, that is, the control input 17, of the transistor 11'. The free end of the resistor 34 is the current supply input of the control circuit 19 and is therefore applied to the collector of the transistor 11'.

The summing of the output voltage of the current sensing element 15 and the in-line voltage at the transistor 11 is performed with the aid of a suitably connected voltage divider comprising the two resistors 35 and 36. The voltage divider comprising the resistors 35 and 36 is located between the two lines 26 and 27, or in other words parallel to the operating path of the transistor 11', while the junction between the two resistors 35 and 36 is connected to the base of the transistor 33. Hence the base of the transistor 33 receives a control voltage that is composed of the voltage drop at the resistor 15 plus the collector-to-emitter voltage of the transistor 11', reduced in accordance with the voltage divider ratio of the resistors 35 and 36, or in other words, the voltage drop across the in-line control element.

In addition to or instead of connecting the resistor 36 to the emitter of the transistor 11', as shown in solid lines, a resistor can also be connected to the emitter of the transistor 33, as shown in dashed lines and represented by a resistor 36'; in the final anaylsis, the result is virtually the same circuit function.

Because the voltage drop across the transistor 11' is superimposed on the voltage drop at the resistor 15 in the generation of the control voltage for the transistor 33, the resistor 15 may be smaller in dimension: The conduction voltage of a silicon transistor operated near saturation is approximately 0.4 V. If the voltage divider comprising the two resistors 35 and 36 divides this voltage in half, then a voltage of 0.2 V is present at the resistor 36. Hence the resistor 15 needs to have a size only such as to generate a voltage drop of 0.4 V at the threshold current $I_G$, so that upon attainment of the threshold current $I_G$, the 0.6 V required to control the transistor 33 into the conductive state will be available. Without the superimposition of the in-line voltage of the transistor 11', the resistor 15' would have to be correspondingly larger.

OPERATION

The circuit operates as described above. During normal operation, that is, below an output voltage less than $U_Z$ and a current less than $I_G$, the voltage drop at the resistor 15' together with the voltage drop at the resistor 36 is too small to make the transistor 33 conductive, and thus it remains in the blocking state. Because of the blocked transistor 33, all the current that flows via the resistor 34 can flow into the base of the transistor 11' and keeps the transistor 11' in a conductively saturated state, regardless of the magnitude of the current at the output 7 of the safety barrier 1. On the other hand, if the current picked up at the output 7 increased beyond the threshold value, then the sum of the voltages at the resistor 36 and the resistor 15' is above the threshold at which the transistor 33 blocks transistor 33 begins to become conductive, and therefore a portion of the current from the resistor 34 is diverted toward the load side via the transistor 33. If the resultant diversion of current at the function 18 is great enough, then the transistor 11' is turned off, causing an increase in the voltage drop at the resistor 36, at which as explained above a voltage proportional to the voltage across the transistor 11' is present. The voltage increase taking place at the resistor 36 because of the turning off of the transistor 11' results in further turning on of the transistor 33, which thus continues to transfer current from the resistor 34. Depending upon how high or how low the voltage divider ratio through the resistors 35 and 36 is, output characteristic lines that are located between the curves 31 and 29 of FIG. 2 can be attained. A low voltage divider ratio, that is a pronounced feedback of the voltage across the transistor 11' to the input of the transistor 33, results in the sharply folded-back characteristic 29, while a high voltage divider ratio shifts the characteristic in the direction of the straight line 31 shown in dashed lines. The same is true for the embodiment having the resistor 36' instead of the resistor 36. A capacitor 37 provided between the base and the collector of the transistor 33 serves solely to supress the tendency to oscillate and has no influence otherwise on the static operation of the circuit.

If it is important to relieve the thermally vulnerable transistor 11' located in the in-line branch of the safety barrier 1, then as FIG. 3 shows it can readily be bridged by a correspondingly large parallel resistor 38, which is connected between the emitter and collector of the transistor 11'. However, this parallel resistor cannot be larger than the size at which the maximum short-circuit current, given a permissible maximum voltage at the input 4, does not exceed the permissible threshold value. The steep characterisitc is adhered to in any case only because the in-line voltage of the transistor 11' is additionally used as the control voltage for the transistor 33. Otherwise, when the threshold current is reached it would not be possible to attain a sufficiently steep limiting characterisitc.

Figure 4:
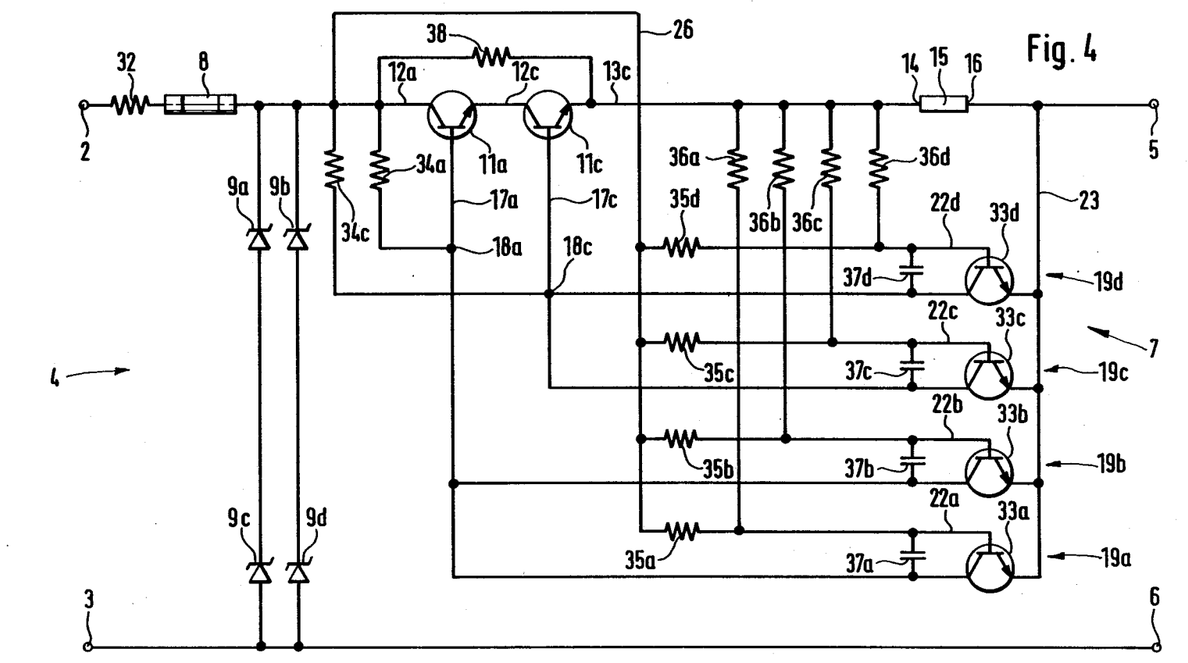
FIG. 4 is a detailed circuit diagram of an error-tolerant safety barrier according to the invention and meeting United States and Canadian standards.

In FIG. 4, a particularly malfunction or failure-tolerant safety barrier 1 is shown that meets the ANSI/UL 4913 standards for the United States and Canada, UL 913 or FM 3610 for the United States and Canada, and standard C 22.2 No. 157-M1979 for Canada. The safety barrier comprises the same basic components and switching circuits as the two safety barriers of FIGS. 1 and 3, but certain elements are designed in duplex or quadruplex form. Components corresponding to one another are provided with the same reference numeral, with a lower case letter added.

To preclude failure of the safety barrier by alloying-through of the transistor in the in-line branch, that is, between the two terminals 2 and 5, two bipolar transistors 11a and 11c are connected in a series circuit between the two terminals 2 and 5. Even if one of the the two transistors alloys through, the other remains controllable. A burn-out resulting in an open circuit, would result in failure in the direction of the safe side.

Both transistors are triggered at their bases, each via two respective control circuits 19a and 19b or 19c and 19d connected in parallel at the output side, and the operating resistors 34 of each two control circuits are combined, so there is only one operating resistor 34a and one operating resistor 34c, one being connected to the base of the transistor 11a and the other to the base of the transistor 11c. The voltage divider comprising the resistors 35 and 36, contrarily, are still present in quadruplex form, with the resistors 35a-35d being connected together with their free ends at the collector of the transistor 11a, that is, at the input-side end of the in-line control element adjacent to the input 4. The free ends of the other two resistors 36a-36d are located in common at the junction between the resistor 15', serving as a current sensing element, and the emitter of the transistor 11c adjacent to the output 7. Each of the voltage dividers 35a, 36a-35d, 36d is connected with its voltage divider pickup at the base of the respective associated transistor 33a-33d, the emitters of which are all connected to the terminal 5.

In this way, all the control circuits 19a-19d are acted upon by control voltages that are the sum of the voltage drop at the single current sensing resistor 15' and the in-line voltage, divided downward in accordance with the resistance ratios of the resistors 35 and 36, of the two transistors 11a and 11c connected in line with one another. This means that only one current sensing element, resistor 15; is present for all of the control circuits 19a-19d; hence the internal resistance of the safety barrier of FIG. 4 does not increase during normal operation as a result of the increase in number of control circuits 19a-19d, and so errorfree operation is attained.

Since two control circuits 19a and 19b or 19c and 19d at a time control each of the transistors 11a, 11c located in the inline branch, control is obtained even if one of the transistors 33a or 33b undergoes a cut-off. The same applies to the pair of transistors 33c and 33d, each of which individually controls the transistor 11c. Even a further error in the form of a shortcircuit of one of the transistors 11a or 11c will not cause failure of the current limitation.

In the event of a current overload at the output 7, the control circuits 19a-19d begin, as explained above, to shut off their associated transistors 11a and 11c located in the in-line branch as soon as the additional voltage drop at the resistor 15 assures that the control voltage at the base of the transistors 33a-33d exceeds the corresponding threshold value.

By means of the disposition of the resistors 34a and 34c, the transistor 11c is kept in the saturation state, which causes a reduction of the internal resistance.

The limiting characterisitc (see FIG. 2) may be made rectangular or even reversed, or folded back. A folded-back characteristic here means that after the limiting condition has occurred, with decreasing output voltages, the barrier currents obtained by means of the limitation become smaller and smaller. In dynamic operation, the result, depending on the dimensioning, is that as soon as the limit condition is attained, if the load does not change the safety barrier regulates the output current downward and as a result the barrier current must first drop below the current at a zero output voltage for the normal operating condition to be attained again.

If a simple ohmic resistor is used as the current sensing element 15 located in series with the in-line control element, the novel circuit makes it possible to make the resistance of this resistor lower than would correspond to the conditions given a threshold voltage of the current circuit and a maximum current, because the control voltage is derived additionally from the voltage drop of the in-line control element 11. Even an in-line control element driven to saturation has a voltage drop that differs from 0 V, and in the case of a bipolar transistor that is approximately 0.4 V. If the threshold voltage of the control circuit is at approximately 0.6 V because of its internal structure and the full in-line voltage of the in-line control element is utilized, then as a result the voltage required at the measuring resistor, which voltage trips the limit condition, is reduced to 0.2 V. As soon as this voltage is exceeded and the control circuit begins to block the in-line control element 11, the resultant additional control voltage is returned with the correct phase to the control input of the control circuit, causing further blocking of the in-line control element.

Even if two such safety barriers are connected in series with one another, to increase error redundancy, the series circuit has a lower internal resistance than that according to the prior art when in the normal, non-limiting operating condition.

If a second in-line control element 11b is connected in series with a first 11a, then in addition to the first control circuit, three further control circuits are provided, (see FIG. 4) of identical structure, the control inputs of which receive as a control voltage a voltage that is the sum of at least part of the output voltage of the single current sensing element and at least part of a voltage corresponding to the sum of the voltage drops at the in-line control elements, the result is a safety barrier that is tolerant to double errors, if the errors relate to components having different functions. Such a safety barrier meets the ANSI/UL 4913 standards for the United States and Canada, as well as UL 913 or FM 3610 for the United States and Canadian standard C 22.2 No. 157-M1979 for Canada. Since a simple ohmic resistor 15' is used as the current sensing element for all control units, the internal resistance of the safety barriers is not increased.

The operating characteristic of the safety barrier can be very simply designed by associating a resistance network with the control input, or with each control input of the control circuit or circuits. The use of the resistance network also has the advantage that the individual control circuits can be decoupled from one another on the input side, so that even in the event of a short-circuit in one of the control circuits, the triggering of the associated in-line control element to effect the desired current limitation through the other control circuits continues to be assured.

Figure 6:
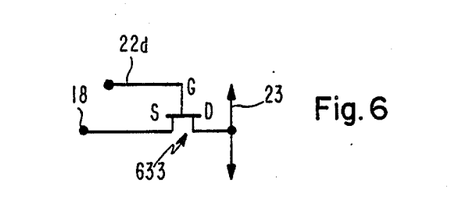
FIG. 6 is a fragmentary diagram showing use of MOS-FETs in the control circuit.
Figure 7:
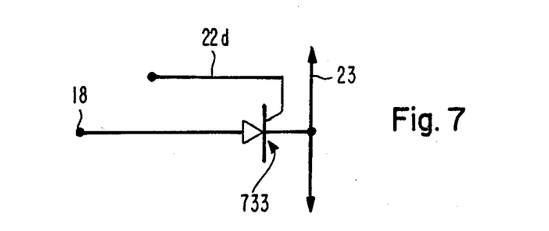
FIG. 7 is a fragmentary diagram showing use of a thyristor in the control circuit.

The resistance network need contain only two serially connected ohmic resistors, of which the first is connected to the terminal oriented toward the barrier input of the in-line control element adjoining the barrier input, while the junction between the first and second ohmic resistors is connected to the control input of the associated control circuit. The free end of the second resistor may be connected either with the barrier output or with the terminal oriented toward the barrier output of the in-line control element adjoining the barrier output. The most sharply-folded back characteristic can be attained in the first case, especially if the second resistor is large as compared with the first resistor. The circuit then switches into the other operating condition after the limiting condition occurs, and the switching speed is limited only by the limiting capacities of the control circuit or by the Miller capacity of the in-line control element. Each of the control circuits may contain as its active element a self-blocking MOS-FET 633 (FIG. 6), a bipolar transistor or a thyristor 733 (FIG. 7), its gate G or base electrode forming the control input and its drain, emitter or cathode electrode being is connected to the barrier output, and its sources, collector or anode electrode being connected to a resistor that is located between the current supply input and the control output of the control circuit.

Figure 5:
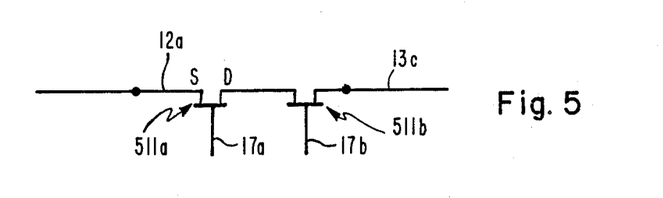
FIG. 5 is a fragmentary diagram showing use of MOS-FETs in the circuit, in which S D and G represent source, drain and gate terminals.

As the in-line control element, both a bipolar transistor and a self-blocking MOS-FET 511a, 511b (FIG. 5) are possible.

To keep the power loss at the in-line control element as low as possible, it may be bridged by an ohmic resistor, which thus assumes a portion of the barrier current.

Various changes and modifications may be made, and features described in connection with any one of the embodiments may be used with any of the others, within the scope of the inventive concept.

I claim:

1. Electrical safety barrier which projects an electrical element located in a possibly hazardous location having
    two input terminals (2, 3) adapted for connection to a source of electrical power;
    two output terminals (5, 6) for connection to the electrical element;
    a controlled resistance means (11);
    a current measuring element (15);
    said resistance means and the current measuring element being connected in series between at least one of the input terminals (2) and an output terminal (5), said resistance means causing an inherent voltage drop thereacross due to current flow therethrough upon connection of the electrical element, and the current measuring element providing a measuring voltage representative of current flow therethrough;
    a control circuit controlling the resistance of said controlled resistance means,
    said control circuit receiving a control input signal comprising at least a portion of said inherent voltage drop and at least a portion of said measuring voltage,
    and wherein
    the controlled resistance means comprises
    a first in-line controlled resistance element (11a) and a second in-line controlled resistance element (11c) serially connected to the first in-line controlled resistance element;
    said control circuit comprises a first (19a), a second (19b), a third (19c) and a fourth (19d) summing means, said four summing means being essentially identical, said four essentially identical summing means having input voltages applied thereto derived from at least a portion of the measuring voltage of said current measuring element and a portion of the inherent voltage drops of said serially connected first in-line controlled element and said second in-line controlled element and forming summed voltages based on said derived input voltages; and control signal applying means, comprising coupling means for coupling the first summing means and the second summing means to a control input of the first in-line control element (11a) and for coupling the third summing means (19c) and the fourth summing means (19d) to a control input of the second in-line controlled element (11c) to provide control voltages for each of said in-line controlled elements (11a, 11c) based on the same input voltages and applied to at least one of the respective first and second in-line controlled elements by at least one of said summing means and coupling means in case of failure of one of the in-line controlled elements or of a summing means and a coupling means.

2. The barrier of claim 1, wherein said means for summing said inherent voltage drops across said respective first and second in-line control elements and said current measuring element (15) comprises four resistance networks (35a–35d; 36a–36d), said resistance networks being individually associated with the respective four summing circuits.

3. The barrier of claim 2, wherein each of the summing circuits includes a transistor (33a–33d) having their respective bases connected to the respective resistance networks.

4. The barrier of claim 2, wherein the resistance networks comprise two serially connected ohmic resistors (35a–35d and 36a–36d), one (35a–35d) of the resistors having one terminal connected to the controlled resistance element (11a) at the side adjacent the input (4);

the junctions between the respective first and second ohmic resistors (35a–35d, 36a–36d) forming summing junctions; and wherein said summing circuit (19a–19d) additionally comprises four controlled elements (33a–33d) having control terminals (22a–22d), each receiving a respective summed signal from a respective summing junction.

5. The barrier of claim 4, wherein the respective second resistors (36a–36d) of said resistance networks are connected to the terminal (13a, 13c) of said controlled resistance element (11c) which is closest to the output (7) of said safety barrier.

6. The barrier of claim 4, wherein the respective second resistors (36a–36d) of said resistance network are connected to a terminal (16) of said current measuring element (15) which is adjacent the output (7) of said safety barrier.

7. The barrier of claim 4, wherein the resistance values of the second resistors (36a–36d) of the resistance networks are large with respect to the resistance values of the first resistors (35a–35d) of the resistance networks.

8. The barrier of claim 5, wherein the resistance values of the second resistors (36a–36d) of the resistance networks are large with respect to the resistance values of the first resistors (35a–35d) of the resistance networks.

9. The barrier of claim 6, wherein the resistance values of the second resistors (36a–36d) of the resistance networks are large with respect to the resistance values of the first resistors (35a–35d) of the resistance networks.

10. The barrier of claim 1, wherein the current measuring element (15) comprises an ohmic resistor.

11. The barrier of claim 1, wherein resistor means (34a, 34c) are provided, having one terminal connected to an input terminal (2);

the summing circuits include resistance networks (35a–35; 36a–36d), each forming a summing junction, and a plurality of active elements (33a–33d);

said active elements each include MOS-FETs (633) (metal oxide silicon - field effect transistors) or bipolar transistors (33a–33d), or thyristors (733) having, respectively, the drain, emitter or cathode electrodes connected to one of the output terminals (5), the source, collector or anode electrodes connected to the resistor means (34a, 34c) at a terminal remote from the connection of said resistor means to the input terminal (2), and the gate or base electrodes connected to respective summing junctions.

12. The barrier of claim 1, wherein the first and second controlled resistance elements (11a, 11c) comprise bipolar transistors or self-blocking MOS-FETs.

13. The barrier of claim 1, further including an ohmic resistor (38) bridging the first and second controlled resistance elements (11a, 11c).

14. The barrier of claim 11, wherein the first and second controlled resistance elements (11a, 11c) comprise bipolar transistors of self-blocking MOS-FETs.

15. The barrier of claim 4, wherein said four controlled elements (33a–34d) include MOS-FETs (633) (metal oxide silicon - field effect transistors) or bipolar transistors (33a–33d), or thyristors (733) having, respectively, the drain, emitter or cathode electrodes connected to one of the output terminals (5), the source, collector or anode electrodes connected to resistor means (34a, 34c) at a terminal remote from the connection of said resistor means to the input terminal (2), and the gate or base electrodes connected to respective summing junctions.

16. The barrier of claim 15, wherein the respective second resistors (36a–36d) of said resistance networks are connected to the terminal (13a, 13c) of said controlled resistance element (11c) which is closest to the output (7) of said safety barrier.

17. The barrier of claim 15, wherein the respective second resistors (36a–36d) of said resistance network are connected to a terminal (16) of said current measuring element (15) which is adjacent the output (7) of said safety barrier.

18. The barrier of claim 17, wherein the resistance values of the second resistors (36a–36d) of the resistance networks are large with respect to the resistance values of the first resistors (35a–35d) of the resistance networks.

19. The barrier of claim 11, wherein the current measuring element (15) comprises an ohmic resistor.

20. The barrier of claim 15, wherein the current measuring element (15) comprises an ohmic resistor.

21. The barrier of claim 1, wherein the first and second in-line controlled resistance elements comprise transistors (11a, 11c); and the control signal applying means couples control signals to said transistors to operate said transistors in saturation when the voltage levels across the input terminals (2, 3), across the output terminals (5, 6) and current flow through the current measuring element (15) are all within predetermined limits.

* * * * *